(12) United States Patent
Adams et al.

(10) Patent No.: US 10,581,926 B2
(45) Date of Patent: Mar. 3, 2020

(54) APPARATUSES AND METHODS FOR COMMUNICATION USING A SUBSCRIBER IDENTITY MODULE

(71) Applicant: NTREPID, LLC, Herndon, VA (US)

(72) Inventors: Benjamin Joseph Adams, San Diego, CA (US); Chad Alan Prey, San Diego, CA (US); Ketal Kautilya Patel, San Diego, CA (US); Evan Michael Mayo, Washington, DC (US); Gerard Edward Hamel, Jr., Herndon, VA (US)

(73) Assignee: NTREPID, LLC, Herndon, VA (US)

(*) Notice: Subject to any disclaimer, the term of this patent is extended or adjusted under 35 U.S.C. 154(b) by 0 days.

(21) Appl. No.: 15/998,399

(22) Filed: Aug. 15, 2018

(65) Prior Publication Data

US 2019/0058738 A1 Feb. 21, 2019

Related U.S. Application Data

(60) Provisional application No. 62/545,786, filed on Aug. 15, 2017.

(51) Int. Cl.
*H04W 8/18* (2009.01)
*H04L 29/06* (2006.01)
*H04L 12/58* (2006.01)
*H04W 88/06* (2009.01)
*H04W 88/16* (2009.01)

(52) U.S. Cl.
CPC ............ *H04L 65/102* (2013.01); *H04L 51/06* (2013.01); *H04L 51/20* (2013.01); *H04W 88/06* (2013.01); *H04W 88/16* (2013.01); *H04L 63/0853* (2013.01); *H04W 8/183* (2013.01)

(58) Field of Classification Search
CPC ....... H04W 12/06; H04W 12/08; H04W 4/02; H04W 92/18
USPC .................. 455/411, 432.1, 435.1, 445, 558
See application file for complete search history.

(56) References Cited

U.S. PATENT DOCUMENTS

| | | | |
|---|---|---|---|
| 2009/0233610 A1* | 9/2009 | Paetsch | H04W 76/12 455/445 |
| 2012/0208392 A1* | 8/2012 | Hsu | G06K 13/0862 439/367 |
| 2016/0050556 A1* | 2/2016 | Zhao | H04W 8/20 455/432.1 |

* cited by examiner

*Primary Examiner* — Sam Bhattacharya
(74) *Attorney, Agent, or Firm* — Squire Patton Boggs (US) LLP

(57) ABSTRACT

Systems, methods, apparatuses, and computer program products for utilizing cellular technology to communicate from locations that are separate or physically distant from the location of a subscriber identity module (SIM) and/or physically separate from a mobile or cellular device are provided. One method may include receiving a request from a user to remotely access at least one physical SIM that is assigned to a global network of radio communications gateways, and assigning at least one of the SIMs to one of the radio communications gateways, so that the assigned SIM is able to route communication to or from the user via its assigned radio communications gateway.

18 Claims, 6 Drawing Sheets

APPARATUSES AND METHODS FOR COMMUNICATION USING A SUBSCRIBER IDENTITY MODULE

CROSS REFERENCE TO RELATED APPLICATIONS

This application claims priority from U.S. Provisional Application No. 62/545,786, filed on Aug. 15, 2017. The entire contents of this earlier filed application are hereby incorporated by reference in their entirety.

BACKGROUND

Field

Certain embodiments may generally relate to systems, apparatuses and methods for utilizing cellular technology for communicating from locations that are separate or physically distant from the location of the subscriber identity module (SIM) of a mobile or cellular device and/or physically separate from the mobile or cellular device itself.

Description of the Related Art

There are certain locations in which access to mobile devices and/or cellular service is restricted or unavailable. One example includes secure facilities or areas with no cell reception. These types of facilities have prohibitive barriers of entry on the types of technologies that are accessible. For example, many secure facilities do not allow entrants to carry communications devices, such as mobile phones, smart phones, or tablets. Other locations may be without cell reception, but have internet access, in which case individuals would be unable to utilize a cellular device.

As such, mobile phones are not functional in these environments. This makes it difficult for individuals in these environments to communicate or to receive and send voice or text messages, such as short message service (SMS) texts. Accordingly, there is a need for providing communication capabilities to and from locations where access to mobile devices and/or cellular service is restricted or impossible.

SUMMARY

One embodiment is directed to a method that may include receiving, at a device or server, a request from a user to remotely access one or more physical SIMs that can be assigned to a global network of radio communications gateways. In an embodiment, the method may also include assigning at least one of the SIMs to one of the radio communications gateways, such that the assigning results in the at least one SIM being able to route communication to/from the user via the assigned radio gateway. The assigning may also result in the at least one SIM remotely serving as a dedicated SIM for the user.

In an embodiment, the method may also include, in response to receiving the request, providing the user with exclusive access to the at least one of the SIMs. According to certain embodiments, the access to the SIMs may allow the user to send and/or receive messages or make voice calls remotely using the SIM(s) the radio gateway associated with the SIM(s).

Another embodiment is directed to an apparatus that may include at least one processor and at least one memory including computer program code. The at least one processor, with the at least one memory and computer program code, may be configured to control the apparatus to at least receive a request from a user to remotely access one or more physical SIMs that can be assigned to a global network of radio communications gateways. In an embodiment, the apparatus may also be controlled to assign at least one of the SIMs to one of the radio communications gateways, such that the assigning results in the at least one SIM being able to route communication to/from the user via the assigned radio gateway. The assigning may also result in the at least one SIM remotely serving as a dedicated SIM for the user.

In some embodiments, the apparatus may be further controlled to, in response to receiving the request, provide the user with exclusive access to the at least one of the SIMs. According to some embodiments, the access to the SIMs may allow the user to send and/or receive messages or make voice calls remotely (e.g., via a web browser) using the SIM and/or the radio gateway associated with the SIM.

Another embodiment is directed to a non-transitory computer readable medium comprising program instructions stored thereon for performing a process that may include receiving a request from a user to remotely access one or more physical SIMs that can be assigned to a global network of radio communications gateways. In an embodiment, the process may also include assigning at least one of the SIMs to one of the radio communications gateways, such that the assigning results in the at least one SIM being able to route communication to/from the user via the assigned radio gateway. The assigning may also result in the at least one SIM remotely serving as a dedicated SIM for the user.

In an embodiment, the process may also include, in response to receiving the request, providing the user with exclusive access to the at least one of the SIMs. According to certain embodiments, the access to the SIMs may allow the user to send and/or receive messages or make voice calls remotely using the SIM(s) the radio gateway associated with the SIM(s).

BRIEF DESCRIPTION OF THE DRAWINGS

For proper understanding of the invention, reference should be made to the accompanying drawings, wherein.

DETAILED DESCRIPTION

Figure 1:
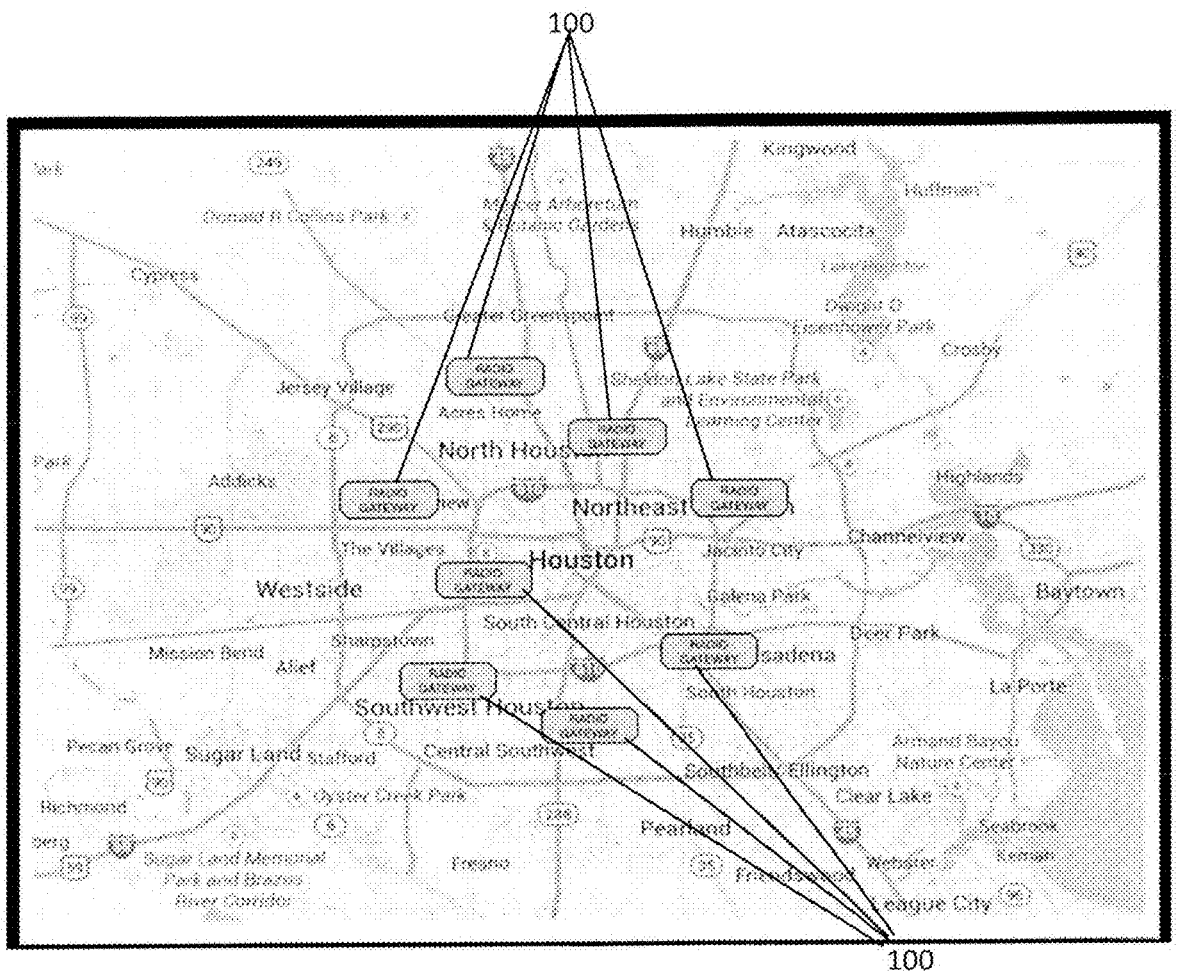
FIG. 1 illustrates an example radio network deployment diagram depicting the deployment of several gateway devices over a geographical region, according to an embodiment.

It will be readily understood that the components of the invention, as generally described and illustrated in the figures herein, may be arranged and designed in a wide variety of different configurations. Accordingly, the following detailed description of embodiments of systems, methods, apparatuses, and computer program products for utilizing cellular technology to communicate from locations that are separate or physically distant from the location of the subscriber identity module (SIM) and/or physically separate from a mobile or cellular device, as represented in the attached figures, is not intended to limit the scope of the invention, but is merely representative of some selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

One embodiment includes a tool or platform that allows users to utilize cellular technology to communicate, for example, from locations without access to a cellular or mobile device. For example, certain embodiments allow users to utilize cellular technology to communicate from locations that are separate or physically distant from the location of a subscriber identity module (SIM) and/or physically separate from a mobile or cellular device. An embodiment may include a platform that implements SIM projection hardware to egress mobile signatures in locations that are disparate of the physical SIM card in use. In an embodiment, users can access the SIM(s) from a third location. In addition, some embodiments provide safeguards to ensure users only execute the actions that they have been authorized to conduct in their facility.

Certain embodiments provide a communication tool that provides users with consistent or appropriate access to mobile phone numbers in various geographic locations. In an embodiment, the communication platform may be accessed via a web browser running on a computer, such as a desktop or laptop computer. In another embodiment, the communication platform may be accessed via an application or "app" running on a mobile phone or other mobile device, such as a tablet. According to one embodiment, the communication tool issues on-demand or dedicated telephone numbers, thereby providing users with the ability to send and receive SMS messages. As mentioned above, in some embodiments, the communication tool may be accessible via web browsers (e.g., CHROME or FIREFOX browsers) and can be utilized standalone or as an application programming interface (API) integrated application with other products or applications.

As discussed above, embodiments of the invention may be useful, for example, in secure areas where access to communications devices is blocked or limited, or in areas where cell service is spotty or unavailable (but which have internet access). According to an embodiment, without leaving the facility, a user can access the communication tool from their computer web browser and remotely manage physical SIM cards that are assigned to a global network of radio gateways. This provides users the ability to at least send and receive SMS from their computer.

Certain embodiments provide users of the communication tool with remote SIM unit access. According to an embodiment, one or more SIM racks are provided to hold, for example, hundreds of physical SIM cards from mobile network operators, which are virtually projected onto separately located radio gateways. Firewalls may enforce traffic flows specific to the operation of SIM virtualization.

Some embodiments may be implemented as a radio geographic network. For example, in an embodiment, SMS and voice traffic transit from a particular gateway unit back to a firewall over dedicated internet protocol security (IPSec) tunnels. Traffic is not permitted to transit from one radio gateway to another radio gateway, and only traffic destined for a centralized controller server is permitted.

In an embodiment, users are able to access the API backend via TLS protected REST API. An application server serves the client application from this environment. In an embodiment, the application server may be accessible to clients over standard TLS web application ports. In one example, the application may use an HTML5 web browser and users may be presented with a user interface for remotely accessing the SIM(s).

FIG. 1 illustrates an example radio network deployment diagram depicting the deployment of several gateway devices 100 over a geographical region. The gateway devices 100 may hold multiple cellular radios in a convenient 1 RU form factor. In one embodiment, the gateway devices 100 may run embedded LINUX and therefore have modest power requirements which allows them to be powered using standard power cables and circuits designed for home or office that use auto-switching between 220 v and 110 v line power. The gateway devices 100 may also be capable of being powered using 6 v-24 v DC power.

Deploying multiple gateway devices 100 in a metro area region may enable a single SIM card to be assigned to different radio gateway devices 100 at different times and depending on different user conditions, thus connecting through different cell towers, which can greatly increase reliability, reach, and access.

Figure 2:
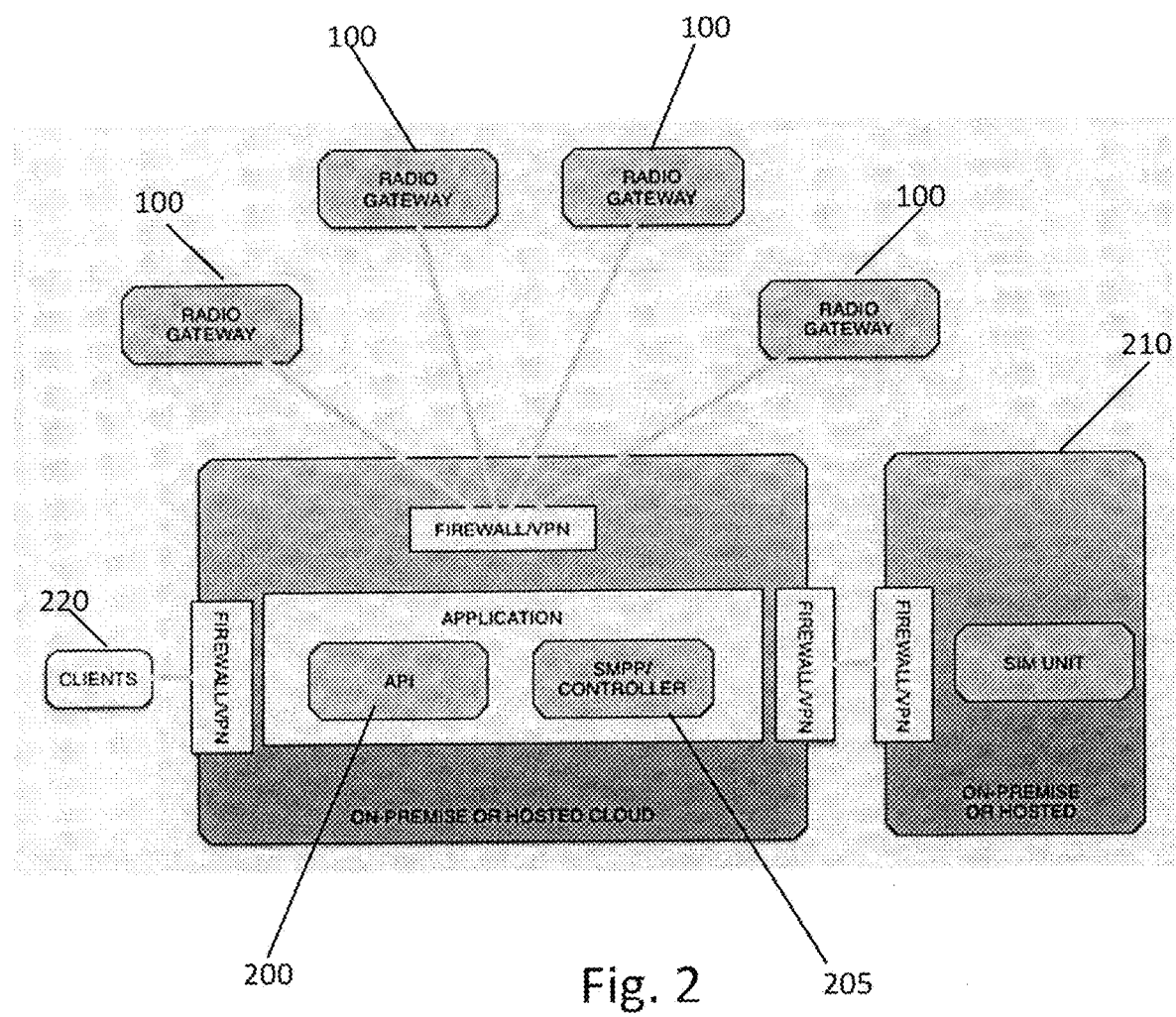
FIG. 2 illustrates a system, according to one embodiment.
Figure 3:
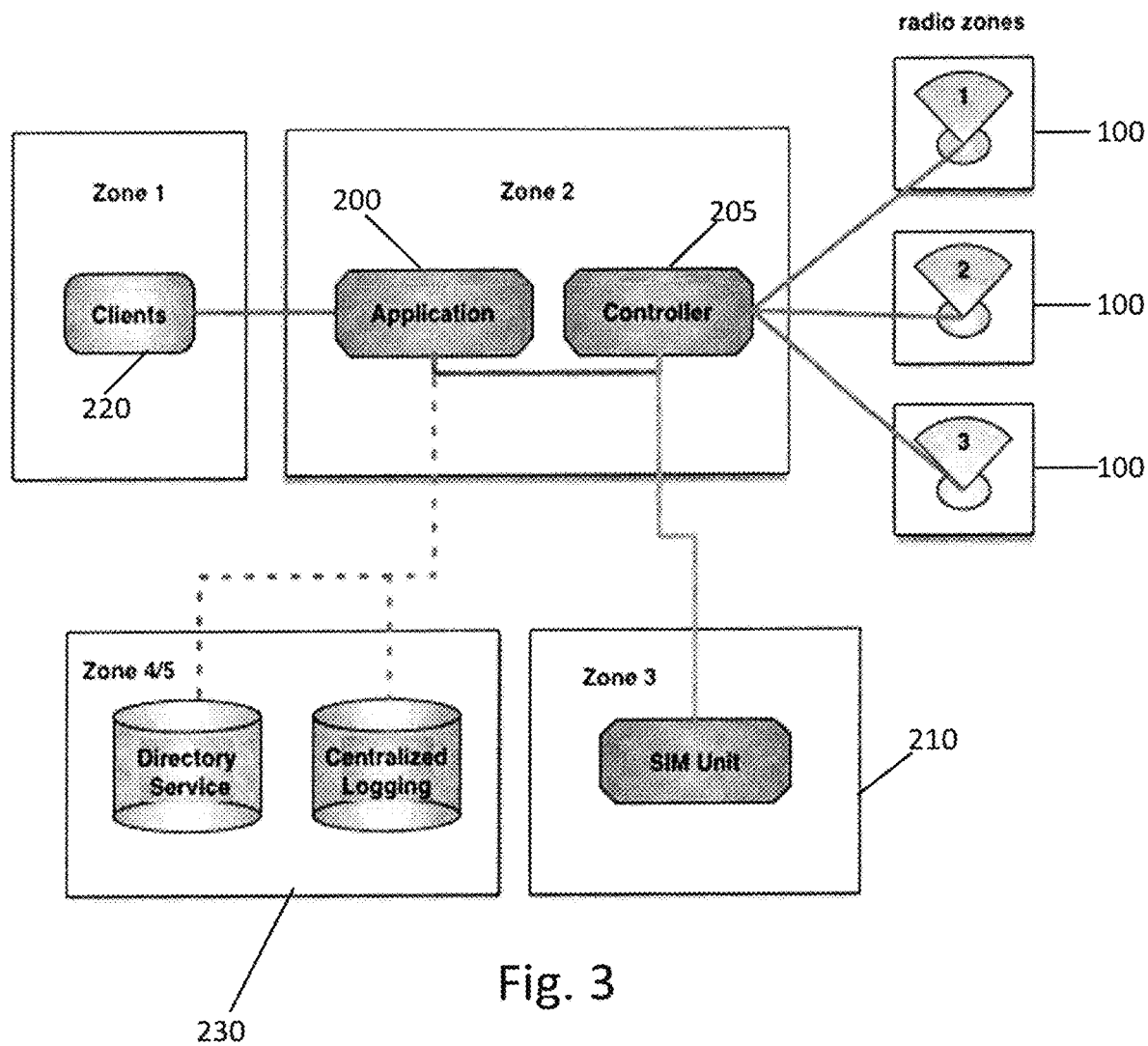
FIG. 3 illustrates a system, according to another embodiment.

FIG. 2 and FIG. 3 illustrate example block diagrams of systems, according to certain embodiments. As illustrated in FIGS. 2 and 3, the system may include an application server 200 that may be connected via a wireless or wired connection to radio gateway devices 100. In an embodiment, application server 200 may be connected via a wireless or wired connection to a SIM unit 210 that may store one or more SIM racks configured to hold, for example, hundreds of physical SIM cards. According to an embodiment, clients or users 220 may access application server 200, which in turn may provide clients 220 with access to use one or more of the physical SIM cards in the SIM unit 210.

According to one embodiment, application server 200 may also be connected via a wireless or wired connection to external databases or memory 230. In other embodiments, application server 200 may include internal databases or memory. In certain embodiments, application server 200 may be provided with a network security system, such as a firewall or VPN, which monitors and controls incoming and outgoing network traffic based on predetermined security rules.

Figure 4:
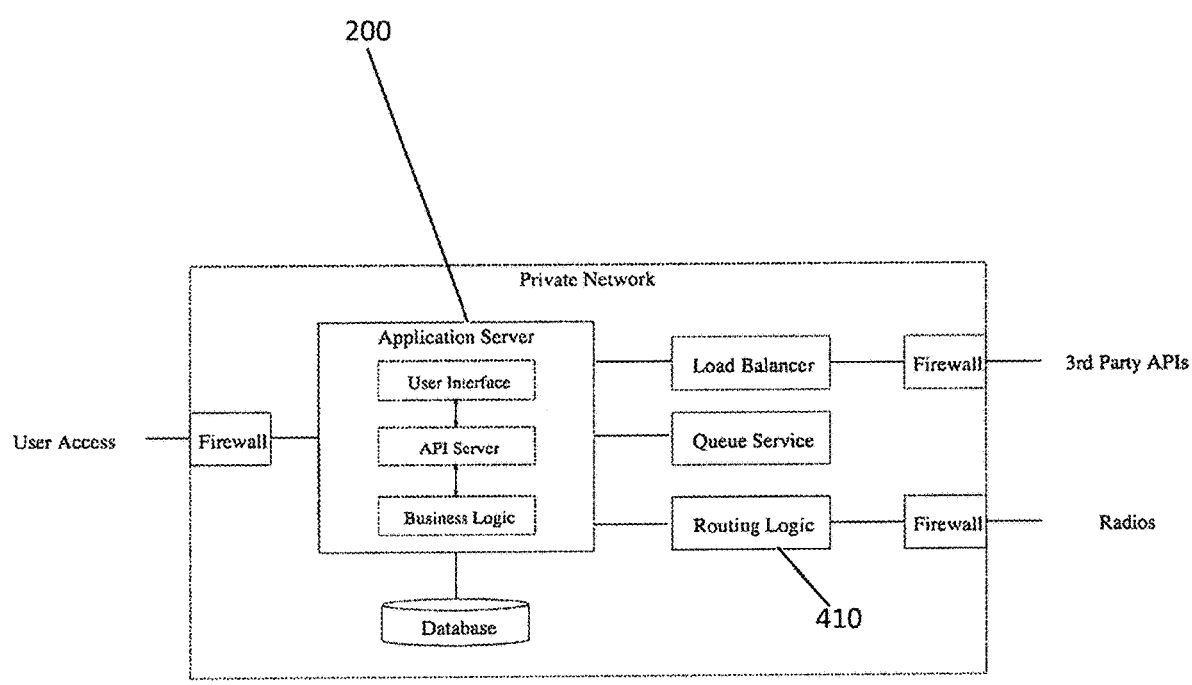
FIG. 4 illustrates a system, according to another embodiment.

FIG. 4 illustrates a block diagram of a system, according to an embodiment. In particular, FIG. 4 illustrates an example embodiment in which application server 200 is hosted in a cloud computing configuration. In the example of FIG. 4, the system may include a controller 410 that may control communications with radio gateway devices 100.

Figure 5:
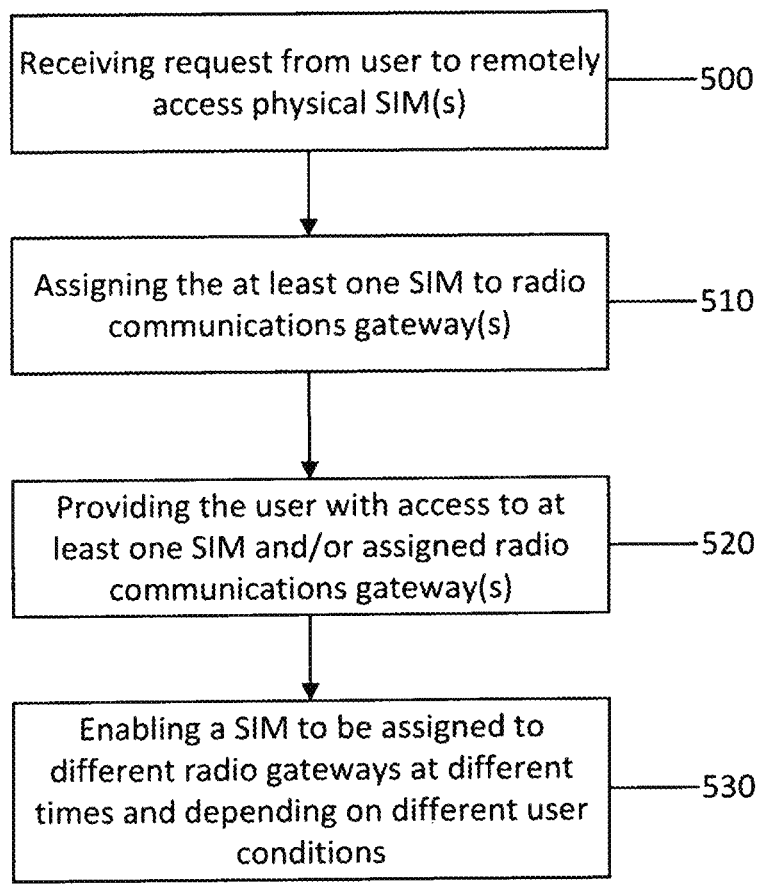
FIG. 5 illustrates an example flow diagram of a method, according to an embodiment.

FIG. 5 illustrates an example flow diagram of a method, according to one embodiment. In some embodiments, the method of FIG. 5 may be performed by one or more of the computing device(s) or system(s) illustrated in FIGS. 2-4, such as application server 200. As illustrated in FIG. 5, the method may include, at 500, receiving, at a device or server, a request from a user to remotely access one or more physical SIMs that can be assigned to a global network of radio communications gateways. The radio communications gateways are radio egress points of presence (e.g., cellular modems or access points) that provide access to a radio communications network, such as a LTE, UMTS, GSM network or the like. In an embodiment, the physical SIMs are hosted or stored in a SIM unit that may include one or more racks of SIMs. In an embodiment, the access to and use of the SIMs may be controlled by a controller of the server.

In an embodiment, at 510, the method may also include assigning at least one SIM to one of the radio communications gateways, such that the assigning results in the at least one SIM routing communication to/from the user via the assigned radio communications gateway. The assigning may also result in the at least one SIM remotely serving as a dedicated SIM for the user. According to one embodiment, the method may also include, at 520, providing the user with exclusive access to at least one of the SIMs. The access to the SIMs may allow the user to send and/or receive messages remotely or make voice calls (e.g., via a web browser) using the SIM and/or radio gateway associated with the SIM. In certain embodiments, the method may optionally include, at 530, enabling a single SIM card to be assigned to different radio gateways at different times and depending on different user conditions.

As a result of the method described above and in FIG. 5, a user is provided remote use of a dedicated or exclusive SIM. Accordingly, a user is able to access the same SIM remotely at a later time and from different locations or devices. Because of this, a user is able to communicate with other mobile devices, via their dedicated SIM, from locations that are physical separate from their dedicated SIM. In this manner, it may be considered that the user has "ownership" of their dedicated SIM. Hence, to any mobile devices or other users that the user communicates with, it will appear that the user is communicating via the same, real mobile device, even though the user is located in a separate physical location from their assigned SIM.

Figure 6:
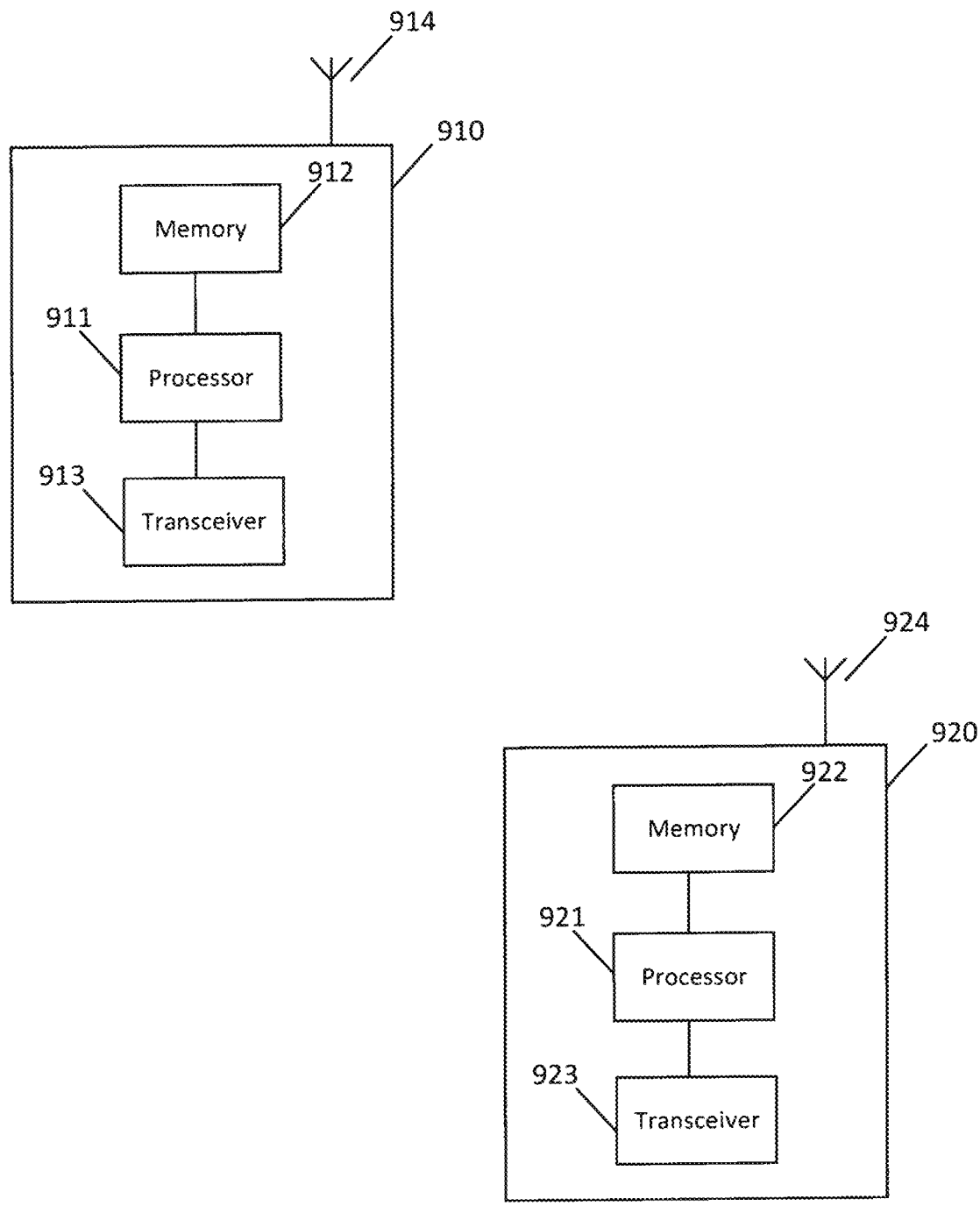
FIG. 6 illustrates a block diagram of a system comprising one or more apparatuses, according to an embodiment.

FIG. 6 illustrates a system according to certain embodiments. In the example of FIG. 6, a system may include several devices, such as, for example, computing device or server 910 and network node 920. The system may include more than one computing device 910 and more than one network node 920, although only one of each is shown for the purposes of illustration. The computing device 910 can be an access point, a server, a host or any of the other network nodes located in a network or cloud computing system. The network node 920 may be a user device, such as a user equipment, desktop computer, laptop computer, or the like. In certain embodiments, the computing device 910 may correspond to the application server discussed above in connection with FIGS. 1-4, and the network node 920 may correspond to the client devices 220 discussed above in connection with FIGS. 1-4.

Each of these devices may include at least one processor or control unit or module, respectively indicated as 911 and 921. Processors 911 and 921 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

At least one memory 912, 922 may be provided in each device, respectively. Memories 912 and 922 may independently be any suitable storage device, such as a non-transitory computer-readable medium. A hard disk drive (HDD), random access memory (RAM), flash memory, or other suitable memory may be used. The memory may include or store computer program instructions or computer code contained therein. In some embodiments, one or more transceivers 923 and 913 may be provided, and each device may also include an antenna, respectively illustrated as 924 and 914. Although only one antenna each is shown, many antennas and multiple antenna elements may be provided for each of the devices. Other configurations of these devices, for example, may be provided. For example, network node 920 and computing device 910 may be additionally configured for wired communication, in addition to wireless communication, and in such a case antennas 924 and 914 may illustrate any form of communication hardware, without being limited to merely an antenna.

Transceivers 923 and 913 may each, independently, be a transmitter, a receiver, or both a transmitter and a receiver, or a unit or device that may be configured both for transmission and reception. The operations and functionalities may be performed in different entities, such as nodes, hosts or servers, in a flexible manner.

The computing device 910 may be any combination of hardware that includes at least a processor and a memory. For example, the computing device may include one or more servers (e.g., application server, web server, file server or the like), and/or one or more computers or computing devices. In some embodiments, the computing device may be provided with wireless capabilities.

In certain embodiments, an apparatus, such as a node or computing device 910, may include means for carrying out embodiments described above in relation to FIGS. 1-5. In certain embodiments, at least one memory including computer program code can be configured to, with the at least one processor, cause the apparatus at least to perform any of the processes or embodiments described herein.

According to certain embodiments, an apparatus may include at least one memory 912 including computer program code, and at least one processor 911. The at least one memory 912 and the computer program code may be configured, with the at least one processor 911, to cause the apparatus at least to receive a request from a user to remotely access one or more physical SIMs that are assigned to a global network of radio communications gateways. The radio communications gateways are radio egress points of presence (e.g., cellular modems or access points) that provide access to a radio communications network, such as a LTE, UMTS, GSM network or the like. In an embodiment, the physical SIMs are hosted or stored in a SIM unit that may include one or more racks of SIMs. In an embodiment, access and use of the SIMs may be controlled by a controller of the server.

In an embodiment, the at least one memory 912 and the computer program code may be configured, with the at least one processor 911, to cause the apparatus at least to assign at least one SIM to one of the radio communications gateways, such that the at least one SIM may route communication to/from a user via the assigned radio communications gateway. According to one embodiment, the at least one memory 912 and the computer program code may be configured, with the at least one processor 911, to cause the apparatus at least to, in response to receiving the request, provide the user with access to the at least one SIM. The access to the SIMs may allow the user to send and/or receive messages remotely or make voice calls (e.g., via a web browser) using the SIM and/or the radio communications gateway associated with the SIM. In certain embodiments, the at least one memory 912 and the computer program code may be configured, with the at least one processor 911, to cause the apparatus at least to dynamically modify the radio gateway that the at least one SIM is assigned to, enabling a single SIM card to be assigned to different radio gateways at different times and depending on different user conditions.

For firmware or software, the implementation may include modules or unit of at least one chip set (for example, procedures, functions, and so on). Memories 912 and 922 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network node 920 and computing device or server 910, to perform any of the processes described above (see, for example, FIGS. 1, 2, 3, 4, and 5). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments may be performed entirely in hardware.

Furthermore, although FIG. 6 illustrates a system including a network node 920 and a computing device 910, certain embodiments may be applicable to other configurations, and configurations involving additional elements, as illustrated and discussed herein. For example, multiple computing devices and multiple network nodes may be present.

In view of the foregoing, embodiments improve conventional solutions by providing critical and heads-up situational awareness to users who do not have direct access to cellular devices and are remotely managing such devices in multiple locations. For example, certain embodiments support two-way SMS communication with appropriate security and support for a user's approved activity. In an embodiment, embodiments can provide an area code, IMSI, IMEI, and signal egress point of presence.

In addition, embodiments provide a scalable solution that removes the likelihood of user error through the use of "guard-rails" such as receive-only permissions to prevent users from sending messages by mistake or without authorization. Furthermore, embodiments provide a platform that includes a user-friendly interface that allows users to manage, e.g., hundreds of physical SIMs.

Moreover, some embodiments enable a SIM card to be assigned to different radio gateways at different times and depending on different user conditions. For instance, by the use of the radio gateways 100, embodiments can choose to connect to the mobile network using different cell towers.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, reference should be made to the appended claims.

We claim:

1. A method, comprising:
   receiving, at a device, a request from a user to remotely access at least one physical subscriber identity module (SIM) that is assigned to a global network of radio communications gateways; and
   assigning, by the device, at least one of said at least one subscriber identity module (SIM) to one of the radio communications gateways,
   wherein the assigning results in the at least one subscriber identity module (SIM) being able to route communication to or from the user via the assigned radio communications gateway, and
   wherein the assigning results in the at least one subscriber identity module (SIM) remotely serving, from a location that is physically separate from the user, as a dedicated subscriber identity module (SIM) for the user.

2. The method according to claim 1, wherein, in response to receiving the request, the method further comprises providing the user with exclusive access to the at least one subscriber identity module (SIM).

3. The method according to claim 2, wherein the access to the at least one subscriber identity module (SIM) allows the user to at least one of send or receive messages or make voice calls remotely using the radio gateway associated with the at least one subscriber identity module (SIM).

4. The method according to claim 3, wherein the user is able to send or receive the messages or make the voice calls remotely via a web browser running on a computer.

5. The method according to claim 3, wherein the assigning further comprises issuing on-demand or dedicated telephone numbers that provide the users with the ability to send or receive the messages or make the voice calls remotely.

6. The method according to claim 1, wherein the user is sited at a location that is separate or physically distant from the at least one subscriber identity module (SIM).

7. An apparatus, comprising:
   at least one processor; and
   at least one memory comprising computer program code,
   the at least one memory and computer program code configured, with the at least one processor, to cause the apparatus at least to
   receive a request from a user to remotely access at least one physical subscriber identity module (SIM) that is assigned to a global network of radio communications gateways; and assign at least one of said at least one subscriber identity module (SIM) to one of the radio communications gateways, wherein the assigning results in the at least one subscriber identity module (SIM) being able to route communication to or from the user via the assigned radio communications gateway, and wherein the assigning results in the at least one subscriber identity module (SIM) remotely serving, from a location that is physically separate from the user, as a dedicated subscriber identity module (SIM) for the user.

8. The apparatus according to claim 7, wherein, in response to receiving the request, the at least one memory and computer program code are further configured, with the at least one processor, to cause the apparatus at least to provide the user with exclusive access to the at least one subscriber identity module (SIM).

9. The apparatus according to claim 8, wherein the access to the at least one subscriber identity module (SIM) allows the user to at least one of send or receive messages or make voice calls remotely using the radio gateway associated with the at least one subscriber identity module (SIM).

10. The apparatus according to claim 9, wherein the user is able to send or receive the messages or make the voice calls remotely via a web browser running on a computer.

11. The apparatus according to claim 9, wherein the assigning further comprises issuing on-demand or dedicated telephone numbers that provide the users with the ability to send or receive the messages or make the voice calls remotely.

12. The apparatus according to claim 7, wherein the user is sited at a location that is separate or physically distant from the at least one subscriber identity module (SIM).

13. A non-transitory computer readable medium comprising program instructions stored thereon for performing a process, comprising:

receiving a request from a user to remotely access at least one physical subscriber identity module (SIM) that is assigned to a global network of radio communications gateways; and assigning at least one of said at least one subscriber identity module (SIM) to one of the radio communications gateways, wherein the assigning results in the at least one subscriber identity module (SIM) being able to route communication to or from the user via the assigned radio communications gateway, and wherein the assigning results in the at least one subscriber identity module (SIM) remotely serving, from a location that is physically separate from the user, as a dedicated subscriber identity module (SIM) for the user.

14. The computer readable medium according to claim 13, wherein, in response to receiving the request, the process further comprises providing the user with exclusive access to the at least one subscriber identity module (SIM).

15. The computer readable medium according to claim 14, wherein the access to the at least one subscriber identity module (SIM) allows the user to at least one of send or receive messages or make voice calls remotely using the radio gateway associated with the at least one subscriber identity module (SIM).

16. The computer readable medium according to claim 15, wherein the user is able to send or receive the messages or make the voice calls remotely via a web browser running on a computer.

17. The computer readable medium according to claim 15, wherein the assigning further comprises issuing on-demand or dedicated telephone numbers that provide the users with the ability to send or receive the messages or make the voice calls remotely.

18. The computer readable medium according to claim 13, wherein the user is sited at a location that is separate or physically distant from the at least one subscriber identity module (SIM).

* * * * *